(12) United States Patent
Lagneaux et al.

(10) Patent No.: US 7,772,309 B2
(45) Date of Patent: Aug. 10, 2010

(54) THERMOPLASTIC POLYURETHANES CONTAINING A SALT OF ZIRCONIUM PHOSPHATE

(75) Inventors: Didier Lagneaux, Chozeau (FR); Vicky M. J. Bertels, Vlimmeren (BE); Robert Jansen, Lommel (BE)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 385 days.

(21) Appl. No.: 11/869,319

(22) Filed: Oct. 9, 2007

(65) Prior Publication Data

US 2008/0114093 A1 May 15, 2008

Related U.S. Application Data

(60) Provisional application No. 60/829,379, filed on Oct. 13, 2006.

(51) Int. Cl.
*C08K 3/32* (2006.01)

(52) U.S. Cl. ...................... 524/417; 524/414

(58) Field of Classification Search .................. 524/414, 524/417
See application file for complete search history.

(56) References Cited

U.S. PATENT DOCUMENTS

| | | | |
|---|---|---|---|
| 4,131,731 A | 12/1978 | Lai et al. | |
| 2002/0187175 A1* | 12/2002 | Petrea et al. | 424/404 |
| 2003/0232933 A1* | 12/2003 | Lagneaux et al. | 525/452 |
| 2004/0180098 A1 | 9/2004 | Decker et al. | |
| 2004/0236035 A1 | 11/2004 | Lagneaux et al. | |
| 2005/0272333 A1 | 12/2005 | Wang et al. | |
| 2006/0116469 A1 | 6/2006 | Taneichi et al. | |
| 2006/0155030 A1* | 7/2006 | Aupaix et al. | 524/413 |

FOREIGN PATENT DOCUMENTS

| | | |
|---|---|---|
| EP | 1 516 745 A1 | 3/2005 |
| KR | 2002-0056058 A | 7/2002 |

* cited by examiner

*Primary Examiner*—Mark Eashoo
*Assistant Examiner*—Angela C Scott
(74) *Attorney, Agent, or Firm*—Joe A. Powell; Samuel B. Laferty; Thoburn T. Dunlap

(57) ABSTRACT

Thermoplastic polyurethane (TPU) compositions are disclosed comprising TPU polymer, polyisocyanate, and a salt of zirconium phosphate. The compositions have enhanced thermal properties, good processability, and good hydrolysis resistance. Processes are also disclosed to combine the ingredients by melt mixing or to prepare the compositions in-situ as the TPU is being polymerized.

25 Claims, No Drawings

THERMOPLASTIC POLYURETHANES CONTAINING A SALT OF ZIRCONIUM PHOSPHATE

CROSS REFERENCE TO RELATED APPLICATION

This application claims priority from U.S. Provisional Application Ser. No. 60/829,379 filed on Oct. 13, 2006.

FIELD OF THE INVENTION

The present invention relates to thermoplastic polyurethane (TPU) compositions which comprise a salt of zirconium phosphate and preferably a multifunctional isocyanate. The TPU compositions have excellent hydrolysis resistance, good thermal properties and very good mechanical properties. Although the TPU compositions can contain a multifunctional isocyanate, which will crosslink the TPU polymer, they can be melt processed as normal uncrosslinked TPU.

BACKGROUND OF THE INVENTION

Thermoplastic polyurethanes are normally made by reacting three essential components. The first component is a polyol, which is a hydroxyl terminated intermediate. The second component is a multifunctional isocyanate, preferably a diisocyanate. The third component is a glycol chain extender, usually a short chain glycol. The three components react to form the TPU polymer. TPUs are classified by types, such as polyether, polyester, and polycarbonate depending on the type of polyol used to make the TPU. For example, a polyether TPU would use a polyether polyol and a polyester TPU would use a polyester polyol, and so on.

It is well known that polyether based thermoplastic polyurethane (TPU) has very good hydrolysis resistance, that is when exposed to water. Unfortunately, polyether TPU has relatively poor thermal resistance. Polyester based TPU has poor hydrolysis resistance but has good thermal resistance and high physical properties, such as tensile strength. The proper selection of a particular TPU for a given end-use application will depend on the environment the TPU will be exposed to in the product use.

It is also known that many physical properties of a TPU can be improved by lightly crosslinking the TPU polymer, usually by adding a multifunctional isocyanate, preferably a diisocyanate. The isocyanate is typically added in a compounding step where the TPU polymer is added to a melt mixing machine, such as a twin screw extruder and the isocyanate is added to the extruder. The compounded polymer is pelletized for further processing to make end products, such as extruded profiles, sheets, and the like, or injection molded into various articles. The addition of the isocyanate to the TPU causes the TPU to crosslink and thus the mixing torque increases and it becomes difficult to process.

It would be desirable to have a TPU which has the good properties of both the polyether TPU and the polyester TPU. It would also be desirable to have a crosslinked TPU which can be processed on melt mixing equipment.

BRIEF SUMMARY OF THE INVENTION

It is an object of the present invention to improve the hydrolysis resistance of polyester TPU.

It is another object of this invention to make a crosslinked TPU which can be processed on melt processing equipment, such as extrusion and injection molding equipment, without substantial increases in torque and pressure read-outs.

It is a further object of this invention to make blends of polyether TPU and polyester TPU which have excellent properties.

It is another object of the present invention to have a process for making crosslinked TPU.

It is also an object of this invention to improve the service temperature of polyester and polyether TPU.

These and other objects are accomplished by using a TPU composition comprising (a) 100 parts by weight of at least one TPU polymer, (b) from about 0.5 to about 10.0 parts by weight of at least one polyisocyanate, and (c) from about 0.1 to about 5.0 parts by weight of at least one salt of zirconium phosphate.

The TPU polymer, polyisocyanate, and salt of zirconium phosphate can be compounded together (mixed) by using melt mixing equipment such as twin screw extruder, mills, Banbury, and the like. The ingredients can also be added in-situ as the TPU is being formed from its reactants.

DETAILED DESCRIPTION OF THE PREFERRED EMBODIMENT

The first essential ingredient of the composition of this invention is at least one thermoplastic polyurethane (TPU for short) polymer.

TPU Polymer

The TPU polymer type used in this invention can be any conventional TPU polymer that is known to the art and in the literature. The TPU polymer is generally prepared by reacting a diisocyanate with an intermediate such as a hydroxyl terminated polyester, a hydroxyl terminated polyether, a hydroxyl terminated polycarbonate or mixtures thereof, with one or more chain extenders, all of which are well known to those skilled in the art.

The hydroxyl terminated polyester intermediate is generally a linear polyester having a number average molecular weight (Mn) of from about 500 to about 10,000, desirably from about 700 to about 5,000, and preferably from about 700 to about 4,000, an acid number generally less than 1.3 and preferably less than 0.8. The molecular weight is determined by assay of the terminal functional groups and is related to the number average molecular weight. The polymers are produced by (1) an esterification reaction of one or more glycols with one or more dicarboxylic acids or anhydrides or (2) by transesterification reaction, i.e., the reaction of one or more glycols with esters of dicarboxylic acids. Mole ratios generally in excess of more than one mole of glycol to acid are preferred so as to obtain linear chains having a preponderance of terminal hydroxyl groups. Suitable polyester intermediates also include various lactones such as polycaprolactone typically made from ,-caprolactone and a bifunctional initiator such as diethylene glycol. The dicarboxylic acids of the desired polyester can be aliphatic, cycloaliphatic, aromatic, or combinations thereof. Suitable dicarboxylic acids which may be used alone or in mixtures generally have a total of from 4 to 15 carbon atoms and include: succinic, glutaric, adipic, pimelic, suberic, azelaic, sebacic, dodecanedioic, isophthalic, terephthalic, cyclohexane dicarboxylic, and the like. Anhydrides of the above dicarboxylic acids such as phthalic anhydride, tetrahydrophthalic anhydride, or the like, can also be used. Adipic acid is the preferred acid. The glycols which are reacted to form a desirable polyester intermediate can be aliphatic, aromatic, or combinations thereof, and have a total of from 2 to 12 carbon atoms, and include ethylene glycol, 1,2-propanediol, 1,3-propanediol, 1,3-butanediol, 1,4-butanediol, 1,5-pentanediol, 1,6-hexanediol, 2,2-diethyl-1,3-propanediol, 1,4-cyclohexanedimethanol, decamethylene glycol, dodecamethylene glycol, hydroquinone di(hydroxyethyl)ether and the like, 1,4-butanediol is the preferred glycol.

Hydroxyl terminated polyether intermediates are polyether polyols derived from a diol or polyol having a total of from 2 to 15 carbon atoms, preferably an alkyl diol or glycol which is reacted with an ether comprising an alkylene oxide having from 2 to 6 carbon atoms, typically ethylene oxide or tetrahydrofuran or mixtures thereof. For example, hydroxyl functional polyether can be produced by first reacting propylene glycol with propylene oxide followed by subsequent reaction with ethylene oxide. Primary hydroxyl groups resulting from ethylene oxide are more reactive than secondary hydroxyl groups and thus are preferred. Useful commercial polyether polyols include poly(ethylene glycol) comprising ethylene oxide reacted with ethylene glycol, poly (propylene glycol) comprising propylene oxide reacted with propylene glycol, poly(tetramethylene glycol) comprising water reacted with tetrahydrofuran (PTMEG). PTMEG is the preferred polyether intermediate. Polyether polyols further include polyamide adducts of an alkylene oxide and can include, for example, a N,N$^1$-dimethyl ethylenediamine adduct comprising the reaction product of ethylenediamine and propylene oxide, diethylenetriamine adduct comprising the reaction product of diethylenetriamine with propylene oxide, and similar polyamide type polyether polyols. Copolyethers can also be utilized in the current invention. Typical copolyethers include the reaction product of THF and ethylene oxide or THF and propylene oxide. These are available from BASF as Poly THF B, a block copolymer, and poly THF R, a random copolymer. The various polyether intermediates generally have a number average molecular weight (Mn), as determined by assay of the terminal functional groups which is an average molecular weight, of from about 250 to about 10,000, desirably from about 500 to about 5,000, and preferably from about 700 to about 3,000.

The polycarbonate-based polyurethane resin of this invention is prepared by reacting a diisocyanate with a blend of a hydroxyl terminated polycarbonate and a chain extender. The hydroxyl terminated polycarbonate can be prepared by reacting a glycol with a carbonate or phosgene.

U.S. Pat. No. 4,131,731 is hereby incorporated by reference for its disclosure of hydroxyl terminated polycarbonates and their preparation. Such polycarbonates are linear and have terminal hydroxyl groups with essential exclusion of other terminal groups. The essential reactants are glycols and carbonates. Suitable glycols are selected from cycloaliphatic and aliphatic diols containing 4 to 40, and preferably 4 to 12 carbon atoms, and from polyoxyalkylene glycols containing 2 to 20 alkoxy groups per molecular with each alkoxy group containing 2 to 4 carbon atoms. Diols suitable for use in the present invention include aliphatic diols containing 4 to 12 carbon atoms such as butanediol-1,4, pentanediol-1,4, neopentyl glycol, hexanediol-1,6, 2,2,4-trimethylhexanediol-1,6, decanediol-1,10, hydrogenated dilinoleylglycol, hydrogenated dioleylglycol; and cycloaliphatic diols such as cyclohexanediol-1,3, dimethylolcyclohexane-1,4, cyclohexanediol-1,4, dimethylolcyclohexane-1,3, 1,4-endomethylene-2-hydroxy-5-hydroxymethyl cyclohexane, and polyalkylene glycols. The diols used in the reaction may be a single diol or a mixture of diols depending on the properties desired in the finished product.

Polycarbonate intermediates which are hydroxyl terminated are generally those known to the art and in the literature. Suitable carbonates are selected from alkylene carbonates composed of a 5 to 7 membered ring having the following general formula:

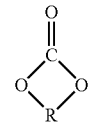

where R is a saturated divalent radical containing 2 to 6 linear carbon atoms. Suitable carbonates for use herein include ethylene carbonate, trimethlylene carbonate, tetramethylene carbonate, 1,2-propylene carbonate, 1,2-butylene carbonate, 2,3-butylene carbonate, 1,2-ethylene carbonate, 1,3-pentylene carbonate, 1,4-pentylene carbonate, 2,3-pentylene carbonate, and 2,4-pentylene carbonate.

Also, suitable herein are dialkylcarbonates, cycloaliphatic carbonates, and diarylcarbonates. The dialkylcarbonates can contain 2 to 5 carbon atoms in each alkyl group and specific examples thereof are diethylcarbonate and dipropylcarbonate. Cycloaliphatic carbonates, especially dicycloaliphatic carbonates, can contain 4 to 7 carbon atoms in each cyclic structure, and there can be one or two of such structures. When one group is cycloaliphatic, the other can be either cycloaliphatic alkyl or aryl. On the other hand, if one group is aryl, the other can be aryl, alkyl or cycloaliphatic. Preferred examples of diarylcarbonates, which can contain 6 to 20 carbon atoms in each aryl group, are diphenylcarbonate, ditolylcarbonate, and dinaphthylcarbonate.

The reaction is carried out by reacting a glycol with a carbonate, preferably an alkylene carbonate in the molar range of 10:1 to 1:10, but preferably 3:1 to 1:3 at a temperature of 100° C. to 300° C. and at a pressure in the range of 0.1 to 300 mm of mercury in the presence or absence of an ester interchange catalyst, while removing low boiling glycols by distillation.

More specifically, the hydroxyl terminated polycarbonates are prepared in two stages. In the first stage, a glycol is reacted with an alkylene carbonate to form a low molecular weight hydroxyl terminated polycarbonate. The lower boiling point glycol is removed by distillation at 100° C. to 300° C., preferably at 150° C. to 250° C., under a reduced pressure of 10 to 30 mm Hg, preferably 50 to 200 mm Hg. A fractionating column is used to separate the by-product glycol from the reaction mixture. The by-product glycol is taken off the top of the column and the unreacted alkylene carbonate and glycol reactant are returned to the reaction vessel as reflux. A current of inert gas or an inert solvent can be used to facilitate removal of by-product glycol as it is formed. When amount of by-product glycol obtained indicates that degree of polymerization of the hydroxyl terminated polycarbonate is in the range of 2 to 10, the pressure is gradually reduced to 0.1 to 10 mm Hg and the unreacted glycol and alkylene carbonate are removed. This marks the beginning of the second stage of reaction during which the low molecular weight hydroxyl terminated polycarbonate is condensed by distilling off glycol as it is formed at 100° C. to 300° C., preferably 150° C. to 250° C. and at a pressure of 0.1 to 10 mm Hg until the desired molecular weight of the hydroxyl terminated polycarbonate is attained. Molecular weight (Mn) of the hydroxyl terminated polycarbonates can vary from about 500 to about 10,000 but in a preferred embodiment, it will be in the range of 500 to 2500.

Suitable chain extender glycols (i.e., chain extenders) are lower aliphatic or short chain glycols having from about 2 to about 10 carbon atoms and include for instance ethylene glycol, diethylene glycol, propylene glycol, dipropylene glycol, 1,4-butanediol, 1,6-hexanediol, 1,3-butanediol, 1,5-pentanediol, 1,4-cyclohexanedimethanol, hydroquinone di(hydroxyethyl)ether, neopentyglycol, and the like, with 1,4-butanediol being preferred. Aromatic glycols can also be used as the chain extender. Benzene glycol (HQEE) and xylenene glycols are suitable chain extenders for use in making the TPU of this invention. Xylenene glycol is a mixture of 1,4-di(hydroxymethyl) benzene and 1,2-di(hydroxymethyl)benzene. Benzene glycol is the preferred aromatic chain extender and specifically includes hydroquinone, i.e., bis(beta-hydroxyethyl)ether also known as 1,4-di(2-hydroxyethyl)benzene; resorcinol, i.e., bis(beta-hydroxyethyl)ether also known as 1,3-di(2-hydroxyethyl)benzene; catechol, i.e., bis (beta-hydroxyethyl)ether also known as 1,2-di(hydroxyethoxy)benzene; and combination thereof. Benzene glycol (HQEE) is the preferred aromatic chain extender. A blend of two or more glycol chain extenders may be used.

The desired TPU polymer used as the TPU for the composition of this invention is generally made from the above-noted intermediates such as a hydroxyl terminated polyesters, polyether, or polycarbonate, preferably polyester, which is further reacted with a polyisocyanate, preferably a diisocyanate, along with chain extender glycol desirably in a so-called one-shot process or simultaneous coreaction of polyester, polycarbonate or polyether intermediate, diisocyanate, and chain extender glycol to produce a high molecular weight linear TPU polymer. The preparation of the TPU polymer is generally well known to the art and to the literature and any suitable method may be used. The weight average molecular weight (Mw) of the TPU polymer is generally about 10,000 to 500,000, and preferably from about 40,000 to about 400,000, and most preferably from about 80,000 to about 300,000 Daltons. The equivalent weight amount of diisocyanate to the total equivalent weight amount of hydroxyl containing components, that is the hydroxyl terminated polyester, polyether, or polycarbonate, and chain extender glycol, is from about 0.95 to about 1.05, preferably from about 0.99 to about 1.01, and most preferably from about 0.995 to about 1.005. Suitable diisocyanates include aromatic diisocyanates such as: 4,4'-methylene bis-(phenyl isocyanate) (MDI); m-xylylene diisocyanate (XDI), phenylene-1,4-diisocyanate, naphthalene-1,5-diisocyanate, diphenylmethane-3,3'-dimethoxy-4,4'-diisocyanate and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. The most preferred diisocyanate is 4,4'-methylene bis(phenyl isocyanate), i.e., MDI.

In the one-shot polymerization process which generally occurs in-situ, a simultaneous reaction occurs between three components, that is the one or more intermediates, the one or more polyisocyanates, and the one or more extender glycols, with the reaction generally being initiated at temperatures of from about 100° C. to about 200° C. Inasmuch as the reaction is exothermic, the reaction temperature generally increases to about 220° C.-250° C.

The level of TPU polymer used in the composition of this invention is 100 weight parts. A single TPU polymer can be used or a blend of two or more TPU polymers can be used to make the composition of this invention. For most applications, it is preferred to use a single TPU polymer in the composition. The selection of the particular TPU(s) used will depend on the desired end product application. TPU properties such as type of TPU (i.e., ester or ether), molecular weight, melting point and hardness are chosen depending on the end use application, as is well understood to those skilled in the art.

TPU polymers which are suitable for use in this invention are commercially available from several manufacturers such as Lubrizol Advanced Materials, Inc., Dow Chemical, Huntsman Chemical, BASF and Bayer. Post industrial and post consumer recycle TPU may also be used in the compositions of this invention.

Salt of Zirconium Phosphate

This invention uses at least one zirconium phosphate salt. The zirconium phosphate salts suitable for use in this invention are silver sodium hydrogen zirconium phosphate, sodium zirconium phosphate, barium zirconium phosphate, as well as other alkali zirconium phosphates, and mixtures thereof. The most preferred zirconium phosphate salt is sodium zirconium phosphate. The zirconium phosphate salts used in this invention function as process aids.

Zirconium phosphate salts are commercially available. Silver sodium hydrogen zirconium phosphate is commercially available from Milliken Chemical under the product designation Antimicrobial AlphaSan® RC 5000. Barium zirconium phosphate and sodium zirconium phosphate are commercially available from SMAT Ceramics under product designations LCB 25 and NCB 50, respectively. The zirconium phosphate preferably has a particle size of from about 1.0 to about 50 microns, and more preferably from about 1.0 to about 6.0 microns.

The zirconium phosphate salts function as a process aid for the TPU composition, but do not reduce the end use physical properties of the TPU. Many prior art process aids do reduce the physical properties, such as high temperature performance, of the TPU.

The level of at least one zirconium salts used in the present invention are from about 0.1 to about 5 parts by weight per 100 parts by weight of the TPU polymer, preferably from about 0.5 to about 3 parts by weight, and more preferably from about 0.5 to about 2.0 parts by weight.

The zirconium salts can be added to the TPU polymer by melt mixing the TPU polymer with the zirconium salts in a compounding step using any known melt mixing equipment, such as extruders, mills, Banbury, and the like. The zirconium salts can also be added in-situ as the TPU polymer is being polymerized. Another method to add the zirconium salts is to prepare a masterbatch in a concentrated form and add the masterbatch to the TPU as it is being processed into its final end use product. An example would be to add the masterbatch at the injection molding step, extrusion step or melt coating step. The details of the masterbatch approach are discussed later in this specification.

Isocyanate Compound

The isocyanate compound used in the composition of this invention is one which will crosslink the TPU polymer under melt mixing conditions to form the composition of this invention. Suitable isocyanates are polyisocyanates, preferably diisocyanates. Suitable diisocyanates include aromatic diisocyanates such as: 4,4'-methylene bis-(phenyl isocyanate) (MDI); m-xylylene diisocyanate (XDI), phenylene-1,4-diisocyanate, naphthalene-1,5-diisocyanate, diphenylmethane-3,3'-dimethoxy-4,4'-diisocyanate and toluene diisocyanate (TDI); as well as aliphatic diisocyanates such as isophorone diisocyanate (IPDI), 1,4-cyclohexyl diisocyanate (CHDI), decane-1,10-diisocyanate, and dicyclohexylmethane-4,4'-diisocyanate. Dimers and trimers of the above diisocynates may also be used. The most preferred diisocyanate is 4,4'-methylene bis(phenyl isocyanate), i.e., MDI.

The polyisocyanate used in the compositions of this invention may be in the form of a low molecular weight polymer or oligomer which is end capped with an isocyanate. For example, the hydroxyl terminated intermediate described above may be reacted with an isocyanate-containing compound to create a low molecular weight polymer end capped with isocyanate. In the TPU art, such materials are normally referred to as pre-polymers. Such pre-polymers normally have a number average molecular weight (Mn) of from about 500 to about 10,000.

Polyisocyanates having a functionality greater than 2.0, such as triisocyanates, may be used in small amounts, but it is preferred to use a diisocyanate.

The level of polyisocyanate used in the composition of this invention is from about 0.5 to about 10.0 weight parts based on 100 weight parts of the TPU polymer, preferably from about 2.0 to about 8.0 weight parts and more preferably from about 2.0 to about 6.0 weight parts. The level of polyisocyanate used, as shown above, is in addition to the polyisocyanate used to make the TPU polymer. The level and functionality of polyisocyanate used will determine whether a thermoplastic or thermoset composition is produced.

There is a surprising synergistic effect of using the polyisocyanate together with the zirconium phosphate salt. Without the zirconium phosphate salt, above about 2.0 weight parts of polyisocyanate, the TPU composition becomes more like a thermoset in that it is more viscous and more difficult to melt process. The zirconium phosphate salt acts as a processing aid and allow more polyisocyanate to be used thus creating better physical properties in an end use product.

Process for Making the TPU Compositions of this Invention

To produce the compositions of this invention, the three essential ingredients [i.e., (1) at least one TPU polymer; (2) at least one zirconium phosphate salt; and (3) at least one polyisocyanate] are combined by melt blending. Any melt blending process known in the art and literature may be used to perform the mixing. Suitable processes include melt blending in a single screw extruder, a twin screw extruder, on a two roll mill, a screw feeding injection molding machine, or in an internal mixer such as a Banbury mixer. Preferably, an extruder is used to melt blend the ingredients to form the composition. The process will be further described using the preferred extrusion process.

The polymer components (TPU) are preferably fed to the extruder in pellet form, as is commercially available. The polyisocyanate can be fed in liquid or solid form (granulates or flakes) to the extruder. The zirconium phosphate salt is also fed to the extruder. The mixing temperature of the melt in the extruder will be a temperature sufficient to melt the polymers such that they can be processed through an extruder. The exact temperature used will depend on the melt processing temperature of the highest melting point polymers used in the composition. Melt processing temperatures for a TPU are typically from about 150° C. to about 250° C., preferably from about 180° C. to about 220° C., depending on the particular TPU used, as can be well understood by those skilled in the art of polymer blending. The ingredients are in the extruder for a very short time such as from about 5 seconds to about five minutes. The reaction between the TPU and the polyisocyanate does not need to be completed within the extruder, as it will continue after exiting the extruder.

An alternate process to produce the composition of this invention is to add the polyisocyanate and zirconium phosphate salt in the process of making the TPU polymer. In this alternative process, the TPU precursor ingredients, i.e., (diisocyanate, hydroxyl terminated intermediate, and chain extender) are added to an extruder and the polyisocyanate and zirconium phosphate salt are added to the extruder, much like a compounding ingredient. The level of polyisocyanate used is in excess of that required to produce the TPU polymer. The equivalent weight of polyisocyanate to the total equivalent weight amount of hydroxyl containing compounds, i.e., the hydroxyl terminated intermediate and chain extender is about 1.0 to produce the TPU polymer. From about 0.5 to about 10.0 weight parts based on 100 weight parts of the combined weight of the TPU polymer precursors of polyisocyanate is used in excess of the 1.0 equivalent weight to produce the TPU polymer. The preferred alternate process is the one-shot process described above in this specification. The TPU polymer is substantially formed before the polyisocyanate and zirconium phosphate is added. The TPU polymer should be at least 80% reacted, and preferably 90% reacted before the polyisocyanate and zirconium phosphate salt are added. The reaction to form the TPU polymer will continue to completion in the presence of the polyisocyanate and zirconium phosphate salt. To allow the TPU polymer to be substantially reacted before addition of the polyisocyanate and zirconium phosphate salt, the polyisocyanate and zirconium phosphate salt are added down-stream in the extruder nearer the exit (die) end of the extruder. For example, in an extruder having four heat zones and entry ports, the polyisocyanate and zirconium phosphate salt would be added in zone 3 or zone 4, whereas the TPU reactants would be added in zone 1. The alternate process may include any of the normal well known processes to make TPU polymer with the exception that the polyisocyanate and zirconium phosphate salt are added to the normal TPU process.

After exiting the extruder, the composition is normally pelletized and stored in moisture proof packaging and is ultimately sold in pellet form. It being understood that the composition would not always need to be pelletized, but rather could be extruded directly from the reaction extruder through a die into a final product profile.

Another process to add the polyisocyanate and zirconium phosphate salt to the TPU composition of this invention is to first prepare a masterbatch where the polyisocyanate and zirconium phosphate salt are mixed in high concentration into a polymer carrier to form what is known in the art of compounding as a masterbatch. The masterbatch could then be added to the TPU polymer in a concentration to achieve the desired level of polyisocyanate and zirconium phosphate salt. The ratio of the weight of each of the polyisocyanate and the zirconium phosphate salt in the masterbatch should be the same ratio as is desired in the final TPU composition. For example, if it is desired to have 4.0 weight parts of polyisocyanate and 2.0 weight parts of zirconium phosphate salt in the final TPU composition, the same weight ratio of 2:1 would be used for the masterbatch. The total amount of the masterbatch used would depend on the level of zirconium phosphate salt and polyisocyanate in the masterbatch and the amount of these two active ingredients desired in the final TPU composition.

The masterbatch uses at least one carrier, which is preferably a polymer. Examples of suitable carriers include polymers such as styrene acrylonitrile copolymer, ethylene vinyl acetate copolymer, ethylene methyl acrylonitrile copolymer, styrene butadiene styrene block copolymer and hydrogenated versions thereof. The polymer carrier could also be low molecular weight polymers and materials such as waxes. A blend of more than one carrier may be used, but preferably a single carrier is used. The preferred polymer carrier is a polymer which is inert with a diisocyanate. The masterbatch could also contain other additives as described below.

A typical formulation for a masterbatch would comprise:
(a) 100 parts by weight of a carrier;
(b) from about 10 to about 240 parts by weight of at least one polyisocyanate;
(c) from about 3.0 to about 60 parts by weight of at least one salt of zirconium phosphate.

The masterbatch can be added to the TPU polymer at the point of melt processing the TPU into its final product application. For example, the masterbatch can be added along with the TPU polymer to the feed of an injection molding machine, an extruder, or melt coating equipment. The melt processing equipment would offer sufficient mixing to incorporate the masterbatch into the TPU polymer.

The masterbatch can be made by any of the normal melt mixing techniques as described above for making TPU compositions. The temperature and processing conditions used to make the masterbatch will depend on the particular carrier selected as is well understood by those skilled in the art of compounding.

Other Ingredients

The compositions of this invention may contain other ingredients which are customary in polymer compositions. Ingredients such as flame retardants, colorants, wax, antioxidants, antiozonates, light stabilizers, fillers, foaming agents, and the like may be used. The level of the other ingredients may be from 0 to about 100 weight parts based on 100 weight parts of the total weight of the TPU polymer, depending on the desired end use application. Fillers, if used, are normally used at a level of from 10 to 40 parts by weight per 100 parts by weight of TPU polymer. Additives, such as colorants, waxes, antioxidants, UV stabilizers, and the like, are normally used at levels of from about 0.1 to about 5 parts by weight per 100 parts by weight of TPU polymer. The choice and amounts desired of the typical TPU additives is well understood to those skilled in the art of making TPU compositions. If other ingredients are used, they may be mixed into the composition in the reactive process to make the TPU or they may be added post-reaction in a compounding step. Compounding ingredients into polymer formulations is a well known art understood by those skilled in the art. Melt mixing equipment such as extruders, two roll mills, Banbury mixers and the like, may be used in the compounding step.

Flame retardants are particularly desirable ingredients to add to the compositions of this invention. Suitable flame retardants include melamine, melamine cyanurate, melamine borate, melamine phosphate, melamine derivatives, organic phosphates, organic phosphonates, halogenated compounds, and mixture thereof. Flame retardants are usually necessary for wire and cable end use applications. The level of flame retardants used for wire and cable jacketing is from about 10 to about 50 weight parts per 100 weight parts of the total weight of the TPU polymer.

Uses

The compositions of this invention have many uses where polymer compositions are currently used. Articles may be extruded into various profiles and shapes such as sheet, film, pipe, and other shaped articles. The compositions may be molded by injection molding, transfer molding or compression molding. The compositions may be calendered into sheet and film using conventional calendering equipment.

The invention will be better understood by reference to the following examples, which are not intended to limit the invention.

EXAMPLES

The Examples below (Examples I-XII) are presented to show the unexpected properties obtained when a combination of a polyisocyanate and a zirconium phosphate are added to a TPU polymer. The additives result in much improved hydrolysis resistance for a polyester TPU. The additives also impart improved high temperature performance to the TPU, while retaining processability. Comparative Examples 1-8 are also presented as controls. All weight parts shown are based on 100 weight parts of TPU polymer, unless specifically stated otherwise.

For Examples I-XI, the additives were compounded (mixed) into an already formed TPU. A ZSK-25 twin screw extruder using a temperature of 200° C. all over the barrel and a screw speed of 120 RPM was used in the compounding step. Example XII used an in-situ process whereby the additives were added in the reactor extruder such that the additives were present in TPU as it was being formed from its reactants.

Test Sample Preparation

The TPU compounds were extruded into strips with a 0.8 mm or 2.0 mm thickness on a Brabender single screw extruder equipped with screen pack. The temperature profile for each of the 5 zones and the die of the Brabender extruder for each sample are shown in Table 1 below. The screw used was a Maillefer type (L/D 25; compression ratio 3:1) and the screw speed was 30 RPM. The extruded tapes were conditioned for 7 days at 23° C. and 50% relative humidity and the test specimen were cut for testing.

TABLE 1

| Example | Zone 1 (° C.) | Zone 2 (° C.) | Zone 3 (° C.) | Zone 4 (° C.) | Zone 5 (° C.) | Die (° C.) |
|---|---|---|---|---|---|---|
| Comp. 1 | 205 | 205 | 200 | 200 | 195 | 195 |
| Comp. 2 | 185 | 190 | 190 | 195 | 200 | 200 |
| Comp. 3 | 185 | 190 | 190 | 195 | 200 | 200 |
| Comp. 4 | 205 | 205 | 200 | 200 | 195 | 195 |
| Comp. 5 | 190 | 195 | 200 | 200 | 205 | 210 |
| Comp. 6 | 205 | 205 | 200 | 200 | 195 | 195 |
| Comp. 7 | 185 | 185 | 190 | 190 | 195 | 195 |
| Comp. 8 | 185 | 185 | 190 | 200 | 200 | 200 |
| I | 185 | 190 | 190 | 195 | 200 | 200 |
| II | 180 | 180 | 185 | 190 | 195 | 200 |
| III | 185 | 190 | 190 | 195 | 200 | 200 |
| IV | 185 | 190 | 190 | 195 | 200 | 200 |
| V | 205 | 200 | 200 | 195 | 190 | 190 |
| VI | 190 | 190 | 200 | 200 | 205 | 210 |
| VII | 185 | 185 | 190 | 190 | 195 | 195 |
| VII | 185 | 190 | 190 | 195 | 195 | 200 |
| IX | 185 | 185 | 190 | 190 | 190 | 190 |
| X | 185 | 185 | 190 | 190 | 195 | 195 |
| XI | 185 | 185 | 190 | 190 | 195 | 195 |
| XII | 185 | 185 | 190 | 200 | 200 | 200 |

Example I

This Example compares a polyester TPU control (Comparative Example 1), the same TPU mixed with 4.0 parts by weight of MDI (Comparative Example 2), the same TPU mixed with 4.0 weight parts of silver sodium hydrogen zirconium phosphate (Comparative Example 3) and the same polyester TPU mixed with 4.0 weight parts each of MDI and silver sodium hydrogen zirconium phosphate (Example I). The results are shown in Table 2 below.

TABLE 2

|  | Comparative Example 1 | Comparative Example 2 | Comparative Example 3 | Example I |
|---|---|---|---|---|
| Ingredient (Parts by Weight) | | | | |
| Estane ® 58447 (1) | 100 | 100 | 100 | 100 |
| MDI (2) | | 4 | | 4 |
| RC-5000 (3) | | | 4 | 4 |
| Process Parameters | | | | |
| Torque (Nm) | 100 | 185 | 160 | 110 |
| Pressure (Bar) | 30 | 74 | 34 | 30 |
| Properties | | | | |
| Hardness (Shore A) | 90 | 90 | 90 | 88 |
| Vicat Soft. Point (° C.) | 95 | 137 | 102 | 148 |
| Kofler MP (° C.) | 180 | 208 | 183 | 212 |

(1) Estane ® 58447 is a polyester TPU commercially available from Lubrizol Advanced Materials, Inc.
(2) MDI is 4,4'-methylene bis (phenyl isocyanate).
(3) RC-5000 is silver sodium hydrogen zirconium phosphate commercially available from Milliken Chemical.

From the data in Table 1, it can be seen that adding 4.0 weight parts of MDI significantly increases the high temperature properties of the TPU as evidenced by the increase in Vicat softening point and Kofler melting point (Comparative Example 2). Unfortunately, the MDI alone causes the polymer to be difficult to process as evidenced by the increase in torque and pressure in the extruder. The addition of 4.0 weight parts of silver sodium hydrogen zirconium phosphate showed little change in high temperature properties (Comparative Example 3). The addition of 4.0 weight parts each of both MDI and silver sodium hydrogen zirconium phosphate resulted in a TPU having improved high temperature properties while retaining good processability (Example I). The unexpected result of adding both MDI and the zirconium phosphate salt gave a TPU with much higher service temperature as shown by both Vicat softening point and Kofler melting point while retaining good processability (low torque and pressure in extruder).

Examples II-V

Examples II-V are presented to show that different salts of zirconium phosphate can be used in different amounts with little influence on processing parameters, while all improve the high temperature properties of the TPU when combined with MDI. The results are shown in Table 3 below.

TABLE 3

|  | Example II | Example III | Example IV | Example V |
|---|---|---|---|---|
| Ingredient (Parts by Weight) | | | | |
| Estane ® 58447 | 100 | 100 | 100 | 100 |
| MDI | 4 | 4 | 4 | 4 |
| RC-5000 | 1 | 2 | | |
| LCB-25 (4) | | | 4 | |
| NCB-50 (5) | | | | 4 |
| Process Parameters | | | | |
| Torque (Nm) | 160 | 160 | 122 | 120 |
| Pressure (Bar) | 30 | 30 | 23 | 25 |
| Properties | | | | |
| Hardness (Shore A) | 92 | 90 | 88 | 91 |
| Vicat Soft. Point (° C.) | 140 | 149 | NM | 148 |
| Kofler MP (° C.) | 208 | 210 | 206 | 212 |

(4) LCB-25 is a barium zirconium phosphate (1.5 micron size) commercially available from SMAT Ceramics, Inc.
(5) NCB-50 is a sodium zirconium phosphate (4-6 micron size) commercially available from SMAT Ceramics, Inc.

Examples VI-VII

Examples VI and VII are presented to show that the combination of MDI and zirconium phosphate salt when added to a polyether TPU show the same improvement in high temperature properties and good processability as was shown in Examples I to V above for polyester TPU. The results are shown in Table 4 below.

TABLE 4

|  | Comparative Example 4 | Comparative Example 5 | Example VI | Example VII |
|---|---|---|---|---|
| Ingredient (Parts by Weight) | | | | |
| Estane ® 58888 (6) | 100 | 100 | 100 | 100 |
| MDI | | 4 | 6 | 6 |
| RC-5000 | | | 1 | |
| LCB-25 | | | | 1 |
| Process Parameters | | | | |
| Torque (Nm) | 150 | 164 | 49 | 45 |
| Pressure (Bar) | 30 | 69 | 27 | 20 |
| Properties | | | | |
| Hardness (Shore A) | 87 | 89 | 91 | 88 |
| Vicat Soft. Point (° C.) | 82 | 113 | 138 | 131 |
| Kofler MP (° C.) | 170 | 200 | 214 | 210 |

(6) Estane ® 58888 is a polyether TPU commercially available from Lubrizol Advanced Materials, Inc.

The above data show that even when 6.0 weight parts of MDI was added to the polyether TPU, the processing parameters (torque and pressure) were low and the TPU could be processed through melt processing equipment. The high temperature properties were also improved.

Examples VIII-IX

Examples VIII and IX are presented to show that blends of polyester and polyether TPU can be used and the same improvement in high temperature properties is observed. Moreover, the additives (MDI and zirconium phosphate salt) have a positive effect on the mechanical properties of the blends, which is likely due to improved compatibilization of the polymers. A higher tensile strength at break as well as improved high temperature properties, while maintaining processability is observed. The results are shown in Table 5 below.

TABLE 5

| Ingredient (Parts by Weight) | Comparative Example 6 | Example VIII | Example IX |
|---|---|---|---|
| Estane ® 58447 | 70 | 70 | 70 |
| Estane ® 58888 | 30 | 30 | 30 |
| MDI |  | 6 | 6 |
| RC-5000 |  | 1 |  |
| LCB-25 |  |  | 1 |
| Process Parameters |  |  |  |
| Torque (Nm) | — | 95 | 120 |
| Pressure (Bar) | — | 32 | 21 |
| Properties |  |  |  |
| Hardness (Shore A) | 92 | 90 | 90 |
| Tensile at Break (MPa) | 50.5 | 61.2 | 65.4 |
| Elongation at Break (%) | 570 | 377 | 361 |
| Vicat Soft.Point (° C.) | 92 | 130 | 149 |
| Kofler MP (° C.) | 200 | 212 | 210 |

Examples X-XI

Examples X and XI are presented to show the improved hydrolysis resistance of a polyester TPU when the combination of MDI and zirconium phosphate salt are added to the TPU. The compounds containing the two additives retain essentially 100% of their original tensile strength after 5 weeks in water at 70° C. The control (Comparative Example 7) only retained 28% of its original tensile after 5 weeks in water at 70° C. After 10 weeks exposure to water at 70° C., the control was too brittle to test, whereas the TPU of this invention retained a significant amount of its original tensile strength. The results are shown in Table 6 below.

TABLE 6

| Ingredient (Parts by Weight) | Comparative Example 7 | Example X | Example XI |
|---|---|---|---|
| Estane ® 58447 | 100 | 100 | 100 |
| MDI |  | 4 | 4 |
| LCB-25 |  | 1 |  |
| NCB-50 |  |  | 1 |
| Tensile Strength (MPa) | 56.1 | 66.5 | 64.7 |
| Retention of Tensile Strength in water at 70° C. after |  |  |  |
| 5 weeks (%) | 28 | 100 | 98 |
| 10 weeks (%) | Too brittle | 64 | 88 |

Example XII

This Example is presented to show that the additives (MDI and zirconium phosphate salt) can be added to the TPU as the TPU is being polymerized (in-situ) from its reactants (polyester polyol, chain extender (BDO), MDI) in a twin screw extruder (the one-shot process). The TPU reactants were added to the twin screw extruder at the feed end of the extruder and the additives were added via a side feeder located near the end (exit) of the extruder.

To 100 parts by weight of the TPU reactants (combined weight of polyester polyol, 1,4-butanediol chain extender, and MDI) there was added 4.0 weight parts of MDI and 2.0 weight parts of sodium zirconium phosphate. The results are shown in Table 7 below.

TABLE 7

| Properties | Comparative Example 8 Estane ® 58447 made with the one-shot process | Example XII Estane ® 58447 with 4.0 weight parts MDI and 2.0 weight parts of sodium zirconium phosphate added in-situ to the extruder reactor in a one-shot process |
|---|---|---|
| Tensile Strength (MPa) | 57.2 | 63.6 |
| Vicat Soft Point (° C.) | 109 | 140 |
| Kofler MP (° C.) | 183 | 205 |

While in accordance with the Patent statutes, the best most and preferred embodiment has been set forth, the scope of the invention is not limited thereto, but rather by the scope of the attached claims.

What is claimed is:

1. A thermoplastic polyurethane composition comprising:
   a) 100 parts by weight of at least one thermoplastic polyurethane polymer;
   b) from about 0.5 to about 10.0 weight parts of at least one polyisocyanate; and
   c) from about 0.1 to about 5.0 weight parts of at least one salt of zirconium phosphate.

2. A thermoplastic polyurethane composition of claim 1, wherein said polyisocyanate is present at a level of from about 2.0 to about 8.0 weight parts and said salt of zirconium phosphate is present at a level of from about 0.5 to about 3.0 weight parts.

3. A thermoplastic polyurethane composition of claim 1 wherein said thermoplastic polyurethane polymer in a) is selected from the group consisting of polyester thermoplastic polyurethane, polyether thermoplastic polyurethane, polycarbonate thermoplastic polyurethane, and mixtures thereof.

4. A thermoplastic polyurethane composition of claim 1, wherein said polyisocyanate in b) is a diisocyanate.

5. A thermoplastic polyurethane composition of claim 4, wherein said diisocyanate is 4,4'-methylene bis(phenyl isocyanate) (MDI).

6. A thermoplastic polyurethane composition of claim 5, wherein said diisocyanate is present at a level of from about 1.0 to about 6.0 weight parts.

7. A thermoplastic polyurethane composition of claim 1 further comprising from about 0.1 to about 5.0 weight parts of at least one additive.

8. A thermoplastic polyurethane composition of claim 1, further comprising from about 0.1 to about 50 weight parts of at least one filler.

9. A thermoplastic polyurethane composition of claim 8, wherein said fillers are selected from the group consisting of flame retardants, talc, clay and mixtures thereof.

10. A thermoplastic polyurethane composition of claim 7, wherein said additives is selected from the group consisting of colorants, antioxidants, light stabilizers, wax, and mixtures thereof.

11. A thermoplastic polyurethane composition of claim 1, wherein said salt of zirconium phosphate is selected from the group consisting of silver sodium hydrogen zirconium phosphate, sodium zirconium phosphate, barium zirconium phosphate, and mixtures thereof.

12. A thermoplastic polyurethane composition of claim 1, wherein said salt of zirconium phosphate is sodium zirconium phosphate.

13. A thermoplastic polyurethane composition of claim 12, wherein said sodium zirconium phosphate has a particle size of from about 1.0 to about 6.0 microns.

14. A process for producing a thermoplastic polyurethane composition comprising blending:
  a) 100 parts by weight of at least one thermoplastic polyurethane polymer;
  b) from about 0.5 to about 10.0 weight parts of at least one polyisocyanate; and
  c) from about 0.1 to about 5.0 weight parts of at least one salt of zirconium phosphate;
  said a), b), and c) are blended under conditions of shear and heat in a melt mixing step in a batch or a continuous process.

15. A process of claim 14, wherein said melt mixing is performed in a continuous process using a twin screw extruder.

16. A process of claim 14, wherein said polyisocyanate is present at a level of from about 2.0 to about 8.0 weight parts and said salt of zirconium phosphate is present at a level of from about 0.5 to about 3.0 weight parts.

17. A process of claim 14, wherein said polyurethane polymer is selected from the group consisting of polyester polyurethane, polyether polyurethane, polycarbonate polyurethane, and mixtures thereof.

18. A process of claim 14 further comprising adding to the blend from about 0.1 to about 5.0 weight parts of additives.

19. A process of claim 14 further comprising adding to the blend from about 10 to about 40 weight parts of at least one filler.

20. A process for producing a thermoplastic polyurethane composition comprising a one-shot process of
  a) feeding thermoplastic polyurethane reactants to the feed section of a twin screw reactor extruder, said reactants comprising:
    (i) at least one hydroxy terminated intermediate (polyol);
    (ii) at least one polyisocyanate;
    (iii) at least one glycol chain extender; and
    (iv) optionally, a catalyst for polyurethane polymerization; and
  b) feeding to said reactor extruder through a side port:
    (i) from about 0.5 to about 10 weight parts per 100 weight parts of at least one polyisocyanate; and
    (ii) from about 0.1 to about 5.0 weight parts of at least one zirconium phosphate salt;
  wherein said weight parts of said polyisocyanate and said zirconium phosphate salt are based on 100 weight parts of said thermoplastic polyurethane reactants.

21. A process of claim 20, wherein said hydroxyl terminated intermediate is selected from a polyester, polyether, polycarbonate, and mixtures thereof.

22. A process of claim 20, wherein said polyisocyanate is 4,4'-methylene bis(phenyl isocyanate) (MDI).

23. A shaped article comprising a TPU composition comprising:
  a) 100 parts by weight of at least one thermoplastic polyurethane;
  b) from about 0.5 to about 100 weight parts of at least one polyisocyanate; and
  c) from about 0.1 to about 5.0 weight parts of at least one salt of zirconium phosphate.

24. A masterbatch composition comprising:
  a) 100 parts by weight of at least one carrier;
  b) from about 10 to about 240 parts by weight of at least one polyisocyanate;
  c) from about 3.0 to about 60 parts by weight of at least one salt of zirconium phosphate.

25. A masterbatch composition of claim 24, wherein said carrier is selected from the group consisting of styrene acrylonitrile copolymer, ethylene vinyl acetate copolymer, ethylene methyl acrylonitrile copolymer, styrene butadiene styrene block copolymer, hydrogenated styrene butadiene-styrene block copolymer, and mixtures thereof.

* * * * *